United States Patent
Miyachi et al.

(10) Patent No.: US 8,308,373 B2
(45) Date of Patent: Nov. 13, 2012

(54) PIN TYPE CAGE AND METHOD OF ASSEMBLING PIN TYPE CAGE

(75) Inventors: Takeshi Miyachi, Yao (JP); Junichi Kubo, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 161 days.

(21) Appl. No.: 12/736,116

(22) PCT Filed: Mar. 10, 2009

(86) PCT No.: PCT/JP2009/054539
§ 371 (c)(1),
(2), (4) Date: Sep. 10, 2010

(87) PCT Pub. No.: WO2009/113534
PCT Pub. Date: Sep. 17, 2009

(65) Prior Publication Data
US 2011/0002572 A1 Jan. 6, 2011

(30) Foreign Application Priority Data
Mar. 10, 2008 (JP) .................... 2008-059417

(51) Int. Cl.
*F16C 33/52* (2006.01)
(52) U.S. Cl. ................ 384/574; 384/579
(58) Field of Classification Search ........... 384/574, 384/579
See application file for complete search history.

(56) References Cited

U.S. PATENT DOCUMENTS

| | | | | |
|---|---|---|---|---|
| 2,267,708 | A * | 12/1941 | Cox | 384/574 |
| 5,067,847 | A | 11/1991 | Muellenberg | |
| RE38,015 | E * | 3/2003 | Murai et al. | 384/579 |
| 8,128,293 | B2 * | 3/2012 | Takahashi | 384/574 |
| 2006/0239601 | A1 * | 10/2006 | Otaka et al. | 384/574 |

FOREIGN PATENT DOCUMENTS

| | | |
|---|---|---|
| JP | 56-115033 | 9/1981 |
| JP | 62-132010 | 6/1987 |
| JP | 02-60717 | 5/1990 |
| JP | 05-026247 | 2/1993 |
| JP | 2002-098153 | 4/2002 |
| JP | 2002-206536 | 7/2002 |
| JP | 2004-052786 | 2/2004 |
| JP | 2004-245392 | 9/2004 |
| JP | 2005-221004 | 8/2005 |
| JP | 2006-336698 | 12/2006 |
| JP | 2007-198539 | 8/2007 |

* cited by examiner

Primary Examiner — Thomas R Hannon
(74) Attorney, Agent, or Firm — McGinn IP Law Group, PLLC

(57) ABSTRACT

An outer tapered member (4) having a conical inner circumferential surface is placed and an inner tapered member (5) having a conical outer circumferential surface in contact with the conical inner circumferential surface is placed in a through hole (31) of a first ring (1). A screw member (6) is screwed a predetermined quantity into the through hole (31) to axially press an axial end face of the inner tapered member (5) toward a second ring (2) with a predetermined force and to press the outer surface of the outer tapered member (4) against the through hole (31) of the first ring (1) with a predetermined force. A weld part (7) in contact with a first ring (1) side end portion of a pin (3) and the first ring (1) is formed to prevent the pin (3) from coming out of the first ring (1) by the weld part (7).

21 Claims, 11 Drawing Sheets

PIN TYPE CAGE AND METHOD OF ASSEMBLING PIN TYPE CAGE

TECHNICAL FIELD

The present invention relates to pin type cages and, in particular, to a pin type cage suitable for use in tapered roller bearings or cylindrical roller bearings which are to be used in wind power generation devices, steel rolling mills or the like. The invention also relates to a method of assembling a pin type cage.

BACKGROUND ART

Conventionally, there has been provided a pin type cage described in JP 2004-245392 A (Patent Literature 1).

This pin type cage includes a first ring, a second ring, a plurality of pins and a plurality of annular bushings.

The first ring has a plurality of through holes, while the second ring a plurality of screw holes. The through holes extend generally along an axial direction of the first ring, and the screw holes extend generally along an axial direction of the second ring. The plurality of through holes are placed so as to be spaced from one another along a circumferential direction of the first ring, and the plurality of screw holes are placed so as to be spaced from one another along a circumferential direction of the second ring.

One end portion of the pin is housed in the through hole of the first ring, while the other end portion of the pin is screwed to the screw hole of the second ring so as to be fixed to the second ring.

The bushings are placed between the through holes of the first ring and one end portion of the pin by press fitting. After the one end portion of the pin is made immovable relative to the first ring by the bushings, welding is applied to make the one end portion of the pin fixed to the first ring.

In the conventional pin type cage shown above, in the working of the through holes, machining variations of about several tens of μm or so occur to the hole diameter, unavoidably. Therefore, in order to realize an interference (more precisely, a desired interference between the through hole and the bushing) that is far smaller than the machining variations, in conventional pin type cages, it is essential to perform selective fitting of the bushing. In this case, the selective fitting of the bushing requires enormous time and labor, so that the selective fitting of the bushing makes an obstacle to mass production.

Further, in the above conventional pin type cage, selection and insertion of a proper-sized bushing is hard to do, and adjustment of the interference is hard to do. Also, it may occur that an erroneously set value of the interference causes large stress to act locally on weld parts of the bushing, which is not a completely rigid material so that the weld parts may be deformed.

Accordingly, an object of the present invention is to provide a pin type cage which makes it possible to simply and inexpensively apply a desired surface pressure to an inner circumferential surface of a through hole of the first ring and to an outer circumferential surface of a pin-through-hole placement portion placed at this through hole, and which is excellent in strength and good at mass production. Another object of the invention is to provide an assembling method for such a pin type cage.

DISCLOSURE OF THE INVENTION

In order to achieve the above object, there is provided a pin type cage comprising:

a first ring having a plurality of through holes placed so as to be circumferentially spaced from one another;

a pin which is inserted into a through hole of a roller and which has a through-hole placement portion placed within the through hole of the first ring;

an outer tapered member having an outer surface in contact with an inner circumferential surface of the through hole of the first ring, an end face located on axial one side, and an annular or generally annular tapered inner surface whose inner diameter increases with increasing axial distance from the end face;

an inner tapered member having an inner surface in contact with the through-hole placement portion of the pin, an end face located on axial one side opposite to the end face side of the outer tapered member, and an annular or generally annular tapered outer surface whose outer diameter decreases with increasing axial distance from the end face and which is in contact with the tapered inner surface of the outer tapered member; and a screw member which has a screw portion and which is in direct contact with or in contact via an intervenient with one end face out of the end face of the outer tapered member and the end face of inner tapered member, wherein a circumferential surface out of an inner circumferential surface of the through hole of the first ring and an outer circumferential surface of the pin has a screw portion that is screwed with the screw portion of the screw member, the pin type cage further has a move-preventing portion which adjoins one circumferential surface out of the inner circumferential surface of the through hole of the first ring and the outer circumferential surface of the pin so as to be in direct contact with or in contact via an intervenient with the other end face out of the end face of the outer tapered member and the end face of the inner tapered member so that the move-preventing portion prevents the end face of the inner tapered member from moving toward one side opposite to the end face side of the outer tapered member in the axial direction, the one end face and the other end face are pressed axially by an axial force generated by being sandwiched between the screw member and the move-preventing portion, so that the tapered inner surface of the outer tapered member and the tapered outer surface of the inner tapered member are pressed by each other, the first ring and the pin are fixed by at least one of the pressing of the outer surface of the outer tapered member against the inner circumferential surface of the through hole and the pressing of the inner surface of the inner tapered member against the through-hole placement portion of the pin, and the pin type cage includes a weld part which is in contact with the screw member, and one of the first ring having the screw portion to be screwed to the screw portion of the screw member and the pin.

Herein, when the term 'axial' or 'radial' is used alone, the axial direction and the radial direction refer to a direction of the pin and a direction of the pin, respectively.

Further, the outer tapered member and the inner tapered member may also be each an annular member or a generally annular member formed into a C-like shape by cutting an annular member at one circumferential place. Each of the outer tapered member and the inner tapered member may be composed of a plurality of members formed by cutting an annular member at circumferential two or more places, and may be each a generally annular member formed from those plural members in combination.

The outer tapered member located radially outward of the pin is preferably radially expandable and contractible, and the outer tapered member is preferably a generally annular member not continuous over the entire circumference. Also, the inner tapered member located radially inward of the pin is preferably a generally annular member not continuous over the entire circumference.

It is also noted that the terms, move-preventing portion adjoining one circumferential surface, mean that one circumferential surface and the move-preventing portion are formed into one integrated member.

According to this invention, the force with which the end face of at least one of the outer tapered member and the inner tapered member is pressed axially against the other end face of one of the outer tapered member and the inner tapered member can be adjusted only by adjusting the tightening quantity of the screw member. Then, as a result of this, the force with which the outer surface of the outer tapered member is pressed toward the inner circumferential surface of the through hole of the first ring can be adjusted, and moreover the force with which the inner surface of the inner tapered member is pressed toward the outer circumferential surface of the pin located in the through hole of the first ring (hereinafter referred to the through-hole placement portion of the pin) can be adjusted. That is, an interference of the pin and the first ring can be set to a desired interference only by adjusting the magnitude of tightening torque for tightening the screw member. Therefore, the interference of the pin and the first ring can be set to a desired interference at high accuracy without requiring any strict machining accuracy for the machining of the through holes of the first ring. Thus, the junction strength between the first ring and the pin can be easily set to a desired strength.

Also according to this invention, management and adjustment of the interference between the pin and the first ring can be achieved easily and inexpensively only by adjusting the magnitude of tightening torque for tightening the screw member. Thus, there is no need for performing selective fitting of component members, so that the pin type cage can be assembled far more easily and improved far more in mass productivity than conventional pin type cages having a need for performing the selective fitting of bushings during the manufacturing process.

Also according to this invention, since the outer tapered member and the inner tapered member are independent members, respectively, machining of the through holes of the first ring and machining of the through-hole placement portion of the pin can be achieved easily. Further, since the screw member and the one of the outer tapered member and the inner tapered member that is in contact with the screw member are separate members, the screw member and the one of the members are more likely to make sliding contact during the tightening of the screw member, while the tapered outer surface and the tapered inner surface are less likely to slide. Thus, the screw member can be tightened easily.

Further according to this invention, since the weld part is included, a desired interference can be maintained so that a desired strength can be maintained.

Also, there is provided a pin type cage comprising:
a first ring having a plurality of through holes placed so as to be circumferentially spaced from one another, an annular tapered inner surface which is placed within each through hole and whose inner diameter increases toward axial one side, and a screw portion located within each through hole and on a larger-diameter side of the tapered inner surface;

a pin which is inserted into a through hole of a roller and which has a through-hole placement portion placed within the through hole of the first ring;

an inner tapered member having an inner surface in contact with the through-hole placement portion of the pin, an annular or generally annular tapered outer surface whose outer diameter increases toward axial one side and which is in contact with the tapered inner surface, and an end face located on the larger-diameter side of the tapered outer surface; and a screw member which has a screw portion screwed to the screw portion of the first ring and which is in direct contact with or in contact via an intervenient with the end face of the inner tapered member, wherein the tapered outer surface of the inner tapered member is pressed against the tapered inner surface of the first ring by the screwing of the screw portion of the first ring and the screw portion of the screw member to each other, and the first ring and the pin are fixed by pressing of the inner surface of the inner tapered member against the outer circumferential surface of the through-hole placement portion of the pin, and the pin type cage includes a weld part which is in contact with the first ring and the screw member.

Even when the outer tapered member is formed integral with the inner circumferential surface of the through hole of the first ring, it is needless to say that the issues in this invention can be solved.

According to this invention, a desired surface pressure can be applied easily and inexpensively to the inner circumferential surface of the through hole of the first ring and the outer circumferential surface of the through-hole placement portion of the pin placed in the through hole. Moreover, the pin type cage becomes good at strength and excellent in mass productivity.

Also, there is provided a pin type cage comprising:
a first ring having a plurality of through holes placed so as to be circumferentially spaced from one another;

a pin which is inserted into a through hole of a roller and which has a through-hole placement portion placed within the through hole of the first ring, an annular tapered outer surface located at an outer circumferential surface of the through-hole placement portion and having an outer diameter gradually decreasing toward axial one side, and a screw portion located on a smaller-diameter side of the tapered outer surface;

an outer tapered member having an outer surface in contact with an inner circumferential surface of the through hole of the first ring, an end face on axial one side, and an annular or generally annular tapered inner surface whose inner diameter decreases with decreasing distance to the end face and which is in contact with the tapered outer surface; and a screw member which has a screw portion screwed to the screw portion of the pin and which is in direct contact with or in contact via an intervenient with the end face of the outer tapered member, wherein the tapered inner surface of the outer tapered member is pressed against the tapered outer surface of the pin by the screwing of the screw portion of the pin and the screw portion of the screw member to each other, the first ring and the pin are fixed by pressing of the outer surface of the outer tapered member against the inner circumferential surface of the through hole, and the pin type cage includes a weld part which is in contact with the pin and the screw member.

Even when the inner tapered member is formed integral with the outer circumferential surface of the through-hole placement portion of the pin, it is needless to say that the issues in this invention can be solved.

According to this invention, a desired surface pressure can be applied easily and inexpensively to the inner circumferential surface of the through hole of the first ring and the outer circumferential surface of the through-hole placement portion of the pin placed in the through hole. Moreover, the pin type cage becomes good at strength and excellent in mass productivity.

In one embodiment of the invention, given an angle $\alpha$ formed by an axis line of the tapered outer surface and a generatrix of the tapered outer surface, it holds that $1/10 \leqq \tan \alpha \leqq 1/3$.

In one embodiment of the invention, given an angle $\alpha$ formed by an axis line of the tapered inner surface and a generatrix of the tapered inner surface, it holds that $1/10 \leqq \tan \alpha \leqq 1/3$.

Given an angle $\alpha$ formed by an axis line of the tapered outer surface and a generatrix of the tapered outer surface, or given an angle $\alpha$ formed by an axis line of the tapered inner surface and a generatrix of the tapered inner surface, if $\tan \alpha > 1/3$, then the radial component force out of normal forces applied to the tapered outer surface and the tapered inner surface is so small that less force is applied radially even if force is applied axially. In contrast to this, if $\tan \alpha \leqq 1/3$, then the axially applied force can be converted efficiently to the radial force. Moreover, if $\tan \alpha \leqq 1/5$, then the axially applied force can be converted to the radial force with far greater efficiency.

On condition that $\tan \alpha < 1/10$, without quite high accuracy of in-contact circumferential surfaces (inner circumferential surface of the through holes of the first ring, outer circumferential surface of the through-hole placement portion of the pin), the pressable axial range would vary to a large extent, making it necessary to elongate the first ring and the pin. For this reason, the pin type cage would increase in scale and its manufacturing material cost would add to. In contrast to this, if $\tan \alpha \geqq 1/10$, then the pressable axial range less varies, the pin type cage is never increased in scale, and its manufacturing material cost never adds to. In addition, if $\tan \alpha \geqq 1/7$, then the pin type cage can be made even more compact, allowing the manufacturing material cost to be largely reduced.

In addition, the angle formed by the axis line of the tapered outer surface and the generatrix of the tapered outer surface, and the angle formed by the axis line of the tapered inner surface and the generatrix of the tapered inner surface, are preferably equal to each other, but these angles may also be different from each other.

In one embodiment of the invention, the inner tapered member is formed by cutting an annular member at one or more places in its circumferential direction.

According to this embodiment, the inner tapered member can easily contract radially.

In one embodiment of the invention, the outer tapered member is formed by cutting an annular member at one or more places in its circumferential direction.

According to this embodiment, the outer tapered member can easily expand radially.

In one embodiment of the invention, the weld part is in contact with the first ring, the pin and the screw member.

According to this embodiment, the pin can be prevented from coming out from the first ring.

In one embodiment of the invention, the pin type cage further comprises a second ring which has a plurality of screw holes placed so as to be circumferentially spaced from one another and which is located with a space to the first ring in an axial direction of the first ring, wherein the pin has a male screw to be screwed to the screw hole of the second ring.

According to this embodiment, since the pin is to be screwed to the second ring, the pin type cage can be assembled with simplicity.

Also, there is provided a pin type cage assembling method for assembling the above pin type cage, comprising the steps of:

preparing the first ring, the second ring, a plurality N of the rollers, the plurality N of the pins, a plurality M (M<N) of spacers each having a length longer than an axial length of each of the rollers, and a temporary fixing member;

setting the spacers interposed between the first ring and the second ring so as to be circumferentially spaced from one another;

thereafter, by the temporary fixing member, tightening the first ring and the second ring so that the two members become immovable relative to each other while center axes of the through holes of the first ring and center axes of the screw holes of the second ring are positioned generally on one straight line;

inserting the pin through the through holes of the first ring that are not blocked by the spacers and then through the through holes of the rollers, followed by screwing the male screw of the inserted pin to the screw hole of the second ring;

subsequently, placing at least one of the outer tapered member and the inner tapered member between the through holes of the first ring and the through-hole placement portion of the pin, so that the tapered outer surface and the tapered inner surface are brought into contact with each other;

subsequently, tightening the screw member by screwing to the first ring or the pin so that the tapered outer surface and the tapered inner surface are pressed against each other;

subsequently, undoing the tightening of the temporary fixing member; and removing the spacers.

According to this invention, the pin type cage of the invention can be assembled with simplicity.

According to the pin type cage of the invention, the interference of the pin and the first ring can be set to a desired interference with high accuracy only by adjusting the magnitude of tightening torque for tightening the screw member. Therefore, the junction strength between the first ring and the pin can be easily set to a desired strength.

Also according to the pin type cage of the invention, management and adjustment of the interference between the pin and the first ring can be achieved easily and inexpensively only by adjusting the magnitude of tightening torque for tightening the screw member. Thus, there is no need for performing selective fitting of component members, so that the pin type cage can be assembled far more easily and improved far more in mass productivity than conventional pin type cages.

DESCRIPTION OF EMBODIMENTS

Hereinbelow, the present invention will be described in detail by embodiments thereof illustrated in the accompanying drawings.

Figure 1:
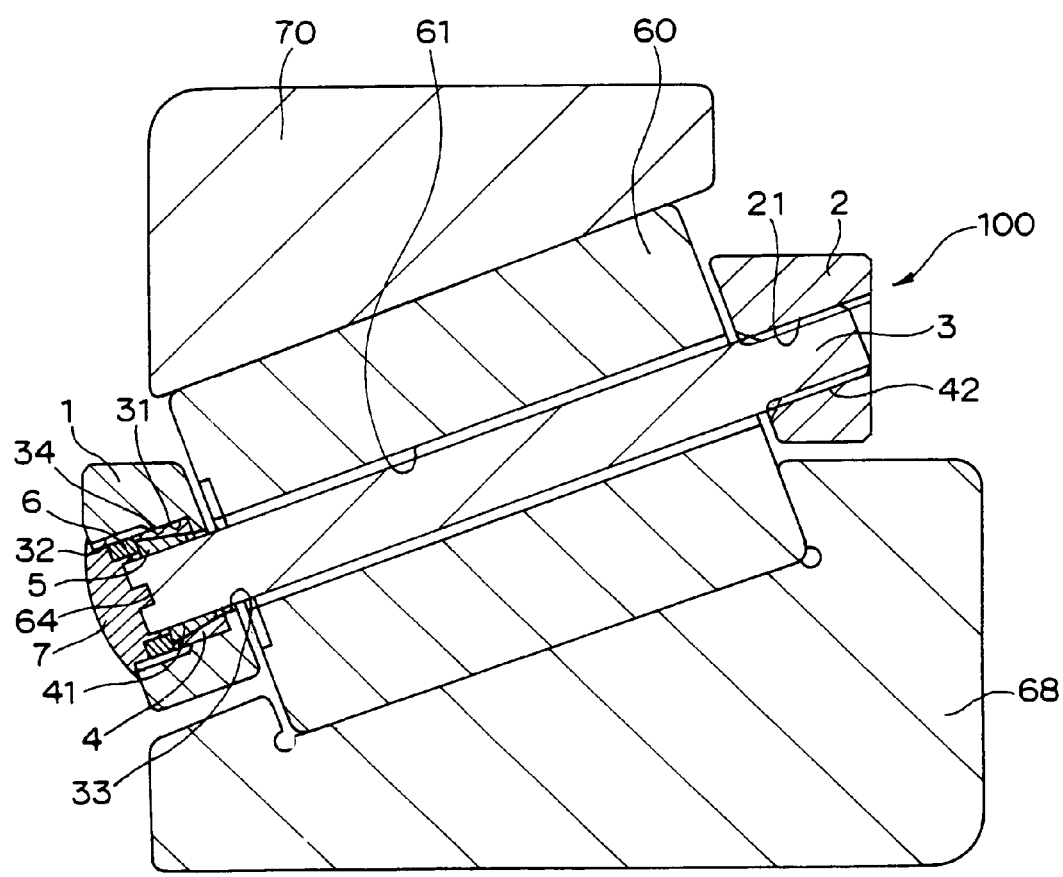
FIG. 1 is an end face view of an axial cross section of a tapered roller bearing according to a first embodiment of the present invention.

FIG. 1 is an end face view of an axial cross section of a tapered roller bearing according to a first embodiment of the invention.

This tapered roller bearing includes an annular outer ring 70, an annular inner ring 68, a plurality of tapered rollers 60, and an annular pin type cage 100. The plurality of tapered rollers 60 are placed between a tapered raceway surface formed on the inner circumference of the outer ring 70 and the tapered raceway surface formed on the outer circumference of the inner ring 68, in a state that the tapered rollers 60 are circumferentially spaced from one another while being held by the pin type cage 100.

The pin type cage 100 includes an annular first ring 1, an annular second ring 2, a plurality of generally round bar-shaped pins 3, an outer tapered member 4, an inner tapered member 5, a screw member 6, and a weld part 7.

The first ring 1 has a plurality of through holes 31, and each of the through holes 31 extends from one axial end face to the other end face of the first ring 1 with its center axis aligned linearly. Also, the plurality of through holes 31 are placed so as to be generally equidistantly spaced from one another along the circumferential direction of the first ring 1.

The inner circumferential surface of each through hole 31 has a female screw 32 at an axially outer-side (counter to the second ring 2 side in the axial direction) end portion. This female screw 32 extends from an end portion of the inner circumferential surface of the through hole 31 of the first ring 1 on the other side counter to the second ring 2 side. Also, the inner circumferential surface of the through hole 31 has a ring-shaped tapered member receiving portion 33 as a move-preventing portion at an axially inner-side (second ring 2 side of the axial direction) end portion. The tapered member receiving portion 33 protrudes radially inward of the first ring 1. Also, the inner circumferential surface of the through hole 31 has a cylindrical inner-circumferential-surface portion 34, which is formed of a cylindrical inner circumferential surface, between the female screw 32 and the tapered member receiving portion 33 in the axial direction.

The second ring 2 is provided with a spacing to the first ring 1 in the axial direction of the first ring 1. The second ring 2 has a plurality of screw holes 21, and each of the screw holes 21 extends linearly from one axial end face to the other end face of the second ring 2. Each of the screw holes 21 is a through hole, and a generally entire inner circumferential surface of the through hole is tapped with a female screw. The plurality of screw holes 21 are placed so as to be generally equidistantly spaced from one another in the circumferential direction of the second ring 2. An axial center of each screw hole 21 is positioned in line with one of axial centers of a plurality of through holes 31 of the first ring 1.

Each of the pins 3 is to be inserted into a through hole 61 of the tapered roller 60. It is noted that although a tapered roller is shown as an example in this embodiment, yet the roller may be a cylindrical roller or a convex roller (spherical roller) in this invention. The through hole 61 extends along the axial center of the outer-circumferential rolling contact surface of the tapered roller 60. Each of the pins 3 has an outer-circumferential cylindrical surface portion 41 at an axial end portion and a male screw 42 in the outer circumferential surface of the other axial end portion. More specifically, this male screw 42 is formed from an axial end of the outer circumferential surface of the other axial end portion. The male screw 42 is kept from contact with the tapered rollers 60 after assembly. The first ring 1 side of the screw holes 21 of the second ring 2 is chamfered. An incomplete screw portion of the male screw 42 is accommodated in the chamfered portion of the second ring 2.

The pin 3, after being inserted into the through hole 61 of the tapered roller 60, is fixed by its one end portion being fixed to the first ring 1 and by the male screw 42 of its other end portion being screwed to the screw hole 21 of the second ring 2. It is noted that a portion out of the one end portion of each pin 3, which is placed in the through hole 31 of the first ring 1, serves as a through-hole placement portion. A first ring 1 side end face of the pin 3 has a linear cutout 64. Applying torque to the pin 3 with a jig (not shown) inserted into this cutout 64, the male screw 42 of the pin 3 is screwed into the screw hole 21 of the second ring 2.

Figure 9:
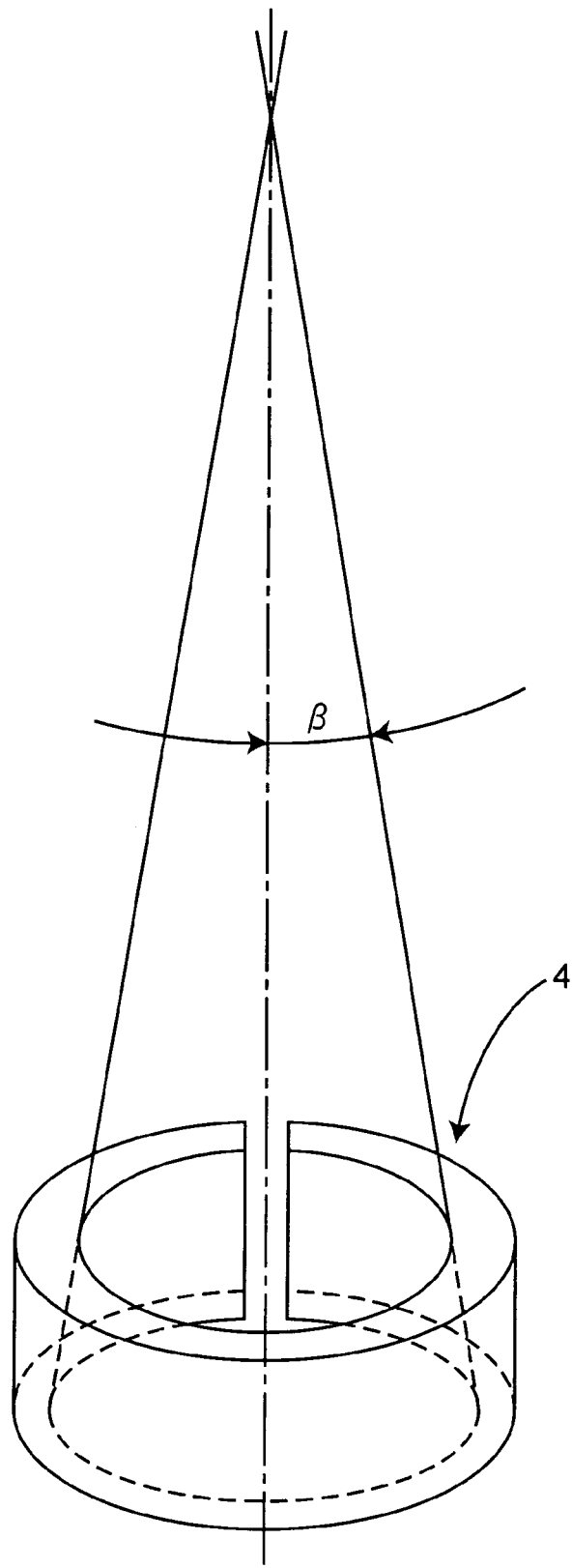
FIG. 9 is a perspective view of an outer tapered member in the first, third, fourth, fifth and sixth embodiments.

Next, the outer tapered member 4, the inner tapered member 5 and the screw member 6 is explained. FIG. 9 is a perspective view of the outer tapered member 4. As shown in FIG. 9, the outer tapered member 4 is cut at a circumferential one place, having a C-shaped structure. More specifically, the outer tapered member 4 is so shaped that an annular member having a cylindrical outer circumferential surface and a conical inner circumferential surface of the same axial center is cut axially at a circumferential one place.

As shown in FIG. 1, the outer tapered member 4 is placed within the through hole 31 of the first ring 1. The outer tapered member 4 has a conical inner circumferential surface (which, although not a circumferential surface strictly, will yet be expressed as circumferential surface hereinafter) as a tapered inner surface. The smaller-diameter side of the conical inner circumferential surface is located on the second ring 2 side in the axial direction. Also, in the outer tapered member 4, the cylindrical outer circumferential surface (which, although not a circumferential surface strictly, will yet be expressed as circumferential surface hereinafter) as an outer surface is in contact with a cylindrical inner-circumferential-surface portion 34 of the through hole 31 of the first ring 1. Also, the second ring 2-side axial end face of the outer tapered member 4 is in contact with the axial end face of the tapered member receiving portion 33 of the first ring 1. The tapered member receiving portion 33 serves a role of prohibiting the outer tapered member 4 from axially moving.

Figure 10:
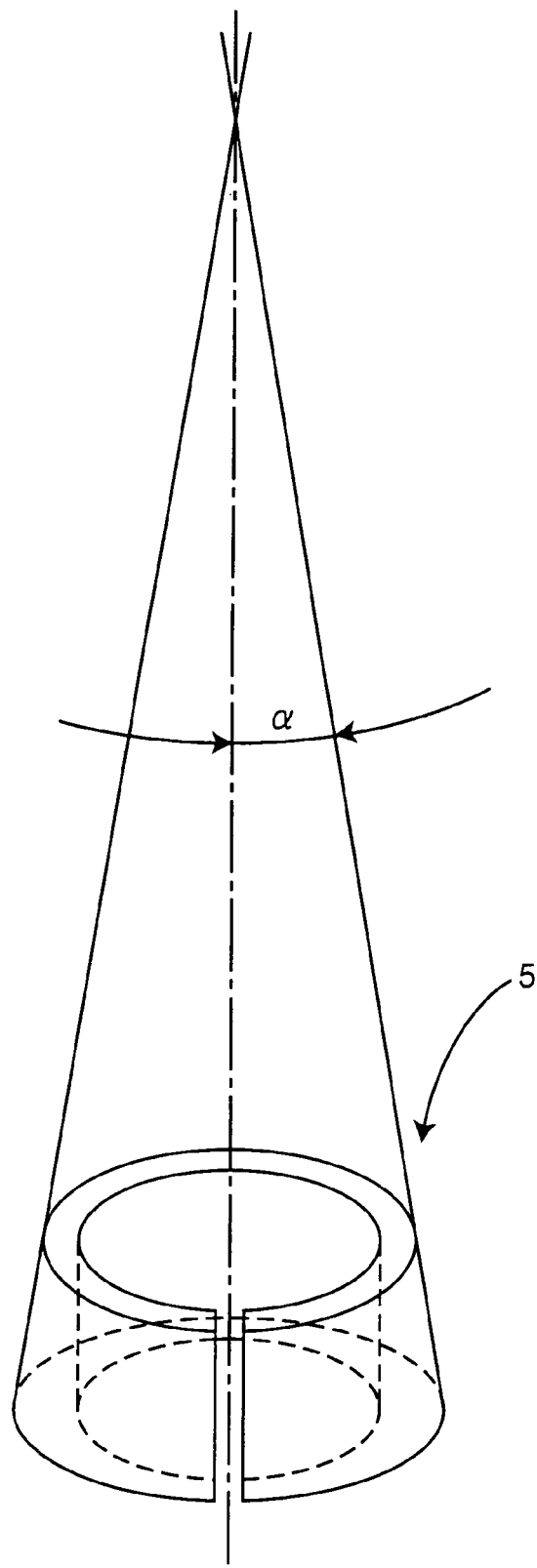
FIG. 10 is a perspective view of an inner tapered member in the first, second, third, fourth and sixth embodiments.

FIG. 10 is a perspective view of the inner tapered member 5. As shown in FIG. 10, the inner tapered member 5, being cut at a circumferential one place like the outer tapered member 4, has a C-shaped structure. The inner tapered member 5 has a conical outer circumferential surface (which, although not a circumferential surface strictly, will yet be expressed as circumferential surface hereinafter) as a tapered outer surface, and a cylindrical inner circumferential surface (which, although not a circumferential surface strictly, will yet be expressed as circumferential surface hereinafter) as an inner surface. As shown in FIG. 1, the inner tapered member 5 is placed radially inward of the outer tapered member 4 (radially of the pin 3). The inner tapered member 5 is placed within the through hole 31 of the first ring 1. The smaller-diameter side of the conical outer circumferential surface of the inner tapered member 5 is positioned on the second ring 2 side in the axial direction. The conical outer circumferential surface of the inner tapered member 5 is in contact with the conical inner circumferential surface of the outer tapered member 4, and the cylindrical inner circumferential surface of the inner tapered member 5 is in contact with the outer circumferential surface of the through-hole placement portion of the pin 3. The axial end face of the inner tapered member 5 on the side counter to the second ring 2 side is positioned more on the counter side (axially outer side) to the second ring 2 side in the axial direction than the axial end face of the outer tapered member 4 on the side counter to the second ring 2 side.

Figure 11:
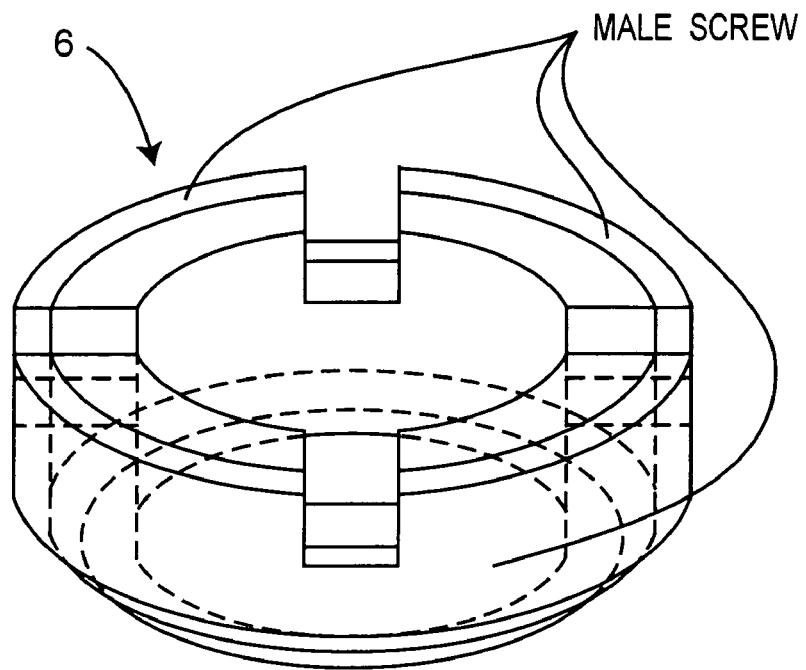
FIG. 11 is a perspective view of a screw member in the first, second and third embodiments.

FIG. 11 is a perspective view of the screw member 6. As shown in FIG. 11, the screw member 6 is a generally cylindrical-shaped annular member, having an outer circumferential surface and a cylindrical inner circumferential surface, and a female screw is formed on the generally entire outer circumferential surface. As shown in FIG. 1, the inner diameter of the cylindrical inner circumferential surface of the screw member 6 is larger than the outer diameter of the outer circumferential surface of a first ring 1-side end portion of the pin 3. The screw member 6 is placed with a spacing to the pin 3. The screw member 6 is axially inserted between the inner circumferential surface of the through hole 31 of the first ring 1 and the outer circumferential surface of the axial one end portion of the pin 3. The male screw of the screw member 6 is screwed with the female screw 32 of the through hole 31 of the first ring 1. The outer tapered member 4-side end portion in the outer circumferential surface of the screw member 6 is chamfered and positioned with a spacing to the female screw 32 of the first ring 1. The end portion of the outer circumferential surface of the screw member 6 has no male screw, and the end portion of the outer circumferential surface of the screw member 6 is positioned with a spacing from the female screw 32. As shown in FIG. 11, the axial end face of the screw member 6 on the counter side to the inner tapered member 5 side has a cross cutout. It is noted that the screw member has a cross cutout in common among all the embodiments described below. The cutout extends through the inner circumference and the outer circumference of the screw member 6, and is radially opened to a female-screw 32 portion in the outer circumferential surface. The screw member 6 is to be tightened up by a jig inserted into this cross cutout.

The inner tapered member 5 receives a force from the screw member 6 axially toward the second ring 2 side, and then due to this force reception, the conical inner circumferential surface of the outer tapered member 4 receives, from the conical outer circumferential surface of the inner tapered member 5, a force normal to the conical outer circumferential surface. Then, due to the force reception, the outer tapered member 4 radially expands, so that the cylindrical outer circumferential surface of the outer tapered member 4 is pressed against the cylindrical inner-circumferential-surface portion 34 of the through hole 31 of the first ring 1. Similarly, the inner tapered member 5 receives a force from the screw member 6 axially toward second ring 2 side, and then due to this force reception, the conical outer circumferential surface of the inner tapered member 5 receives, from the conical inner circumferential surface of the outer tapered member 4, force normal to the conical inner circumferential surface. Then, due to the force reception, the inner tapered member contracts radially, so that the cylindrical inner circumferential surface of the inner tapered member 5 is pressed against the outer circumferential surface of the through-hole placement portion of the pins 3.

The tightening torque of the screw member 6 is so adjusted that the cylindrical outer circumferential surface of the outer tapered member 4 presses the cylindrical inner-circumferential-surface portion 34 of the through hole 31 of the first ring 1 with a specified force and moreover the cylindrical inner circumferential surface of the inner tapered member 5 presses the outer circumferential surface of the through-hole placement portion of the pin 3 with a specified force (a force specified by Standards in individual specifications).

The weld part 7 is in contact with an axial one end portion of the pin 3 on the first ring 1-side and with the first ring 1. Part of the weld part 7 enters between the inner circumferential surface of the screw member 6 and the outer circumferential surface of the pin 3. The weld part 7 fixes one end portion of the pin 3 to the first ring 1 so that the pin 3 is prevented from coming out from the first ring 1 and moreover the screw member 6 is prevented from being rotated relative to the first ring. That is, the weld part 7 serves for positioning of the screw member 6 at a specified position relative to the first ring 1. In this way, the force with which the cylindrical outer circumferential surface of the outer tapered member 4 presses the cylindrical inner-circumferential-surface portion 34 of the through hole 31 of the first ring 1 is maintained at a specified force over a long time period, and also the force with which the cylindrical inner circumferential surface of the inner tapered member 5 presses the outer circumferential surface of the through-hole placement portion of the pin 3 is maintained at a specified force over a long time period. The weld part, also in other embodiments, is preferably in contact with at least one member of the first ring and the pin, whichever is screwed with the screw member, as well as with the screw member, and more preferably in contact with the first ring, the pin and the screw member.

In this first embodiment, part of the female screw 32 and the incomplete screw portion radially overlap with part of the outer tapered member 4 and moreover radially overlap with part of the inner tapered member 5. Also, part of the female screw 32 and the incomplete screw portion radially overlaps with part of a contact portion of the conical inner circumferential surface of the outer tapered member 4 in contact with the conical outer circumferential surface of the inner tapered member. It is noted that the part of the female screw 32 and the incomplete screw portion preferably radially overlaps with ½ or less, preferably ⅓ or less, of the contact portion in the conical inner circumferential surface with the conical outer circumferential surface. Further preferably, the part of the female screw and the incomplete screw portion are positioned with a spacing axially from a portion of the taper inner surface in contact with the taper outer surface.

Also, given an angle $\alpha$ formed by an axis of the conical outer circumferential surface as a taper outer surface of the inner tapered member 5 and a generatrix of the conical outer circumferential surface, it holds that $1/10 \leq \tan \alpha \leq 1/3$. Given an angle $\beta$ formed by an axis of the conical inner circumferential surface as a taper inner surface of the outer tapered member 4 and a generatrix of the conical inner circumferential surface, it holds that $1/10 \leq \tan \beta \leq 1/3$.

Given the angle α formed by the axis of the tapered outer surface and the generatrix of the tapered outer surface, if tan α>1/3, then a radial component force out of a normal force received by the tapered outer surface is small, so that a radial force is less applied even with an axial force applied. Similarly, given the angle β formed by the axis of the tapered inner surface and the generatrix of the tapered inner surface, if tan β>1/3, then a radial component force out of a normal force received by the tapered inner surface is small, so that a radial force is less applied even with an axial force applied.

In contrast to this, on condition that tan α≤1/3 as in the first embodiment, an axially applied force can be changed into a radial force with high efficiency. In addition, on condition that tan α≤1/5, an axially applied force can be changed into a radial force with far more efficiency. Similarly, on condition that tan β≤1/3, an axially applied force can be changed into a radial force with high efficiency. In addition, on condition that tan β≤1/5, an axially applied force can be changed into a radial force with far more efficiency.

On condition that tan α<1/10, without quite high accuracy of in-contact circumferential surfaces (inner circumferential surface of the through holes of the first ring, outer circumferential surface of the through-hole placement portion of the pin), the pressable axial range would vary to a large extent, making it necessary to elongate the first ring and the pin. For this reason, the pin type cage would increase in scale and its manufacturing material cost would add to. Similarly, on condition that tan β<1/10, without quite high accuracy of in-contact circumferential surfaces (inner circumferential surface of the through holes of the first ring, outer circumferential surface of the through-hole placement portion of the pin), the pressable axial range would vary to a large extent, making it necessary to elongate the first ring and the pin. For this reason, the pin type cage would increase in scale and its manufacturing material cost would add to.

In contrast to this, if it holds that tan α≥1/10 as in the first embodiment, then the pressable axial range less varies, the pin type cage 100 is never increased in scale, and its manufacturing material cost never adds to. In addition, if tan α≥1/7, then the pin type cage can be made even more compact, allowing the manufacturing material cost to be largely reduced. Similarly, if it holds that tan β≥1/10, then the pressable axial range less varies, the pin type cage 100 is never increased in scale, and its manufacturing material cost never adds to. In addition, if tan β≥1/7, then the pin type cage can be made even more compact, allowing the manufacturing material cost to be largely reduced.

Also, the larger-diameter end face of the tapered roller 60 is in contact with a larger flange of the inner ring 68, while the smaller-diameter end face of the tapered roller 60 is positioned with a spacing from a smaller flange of the inner ring 68.

Figure 2:
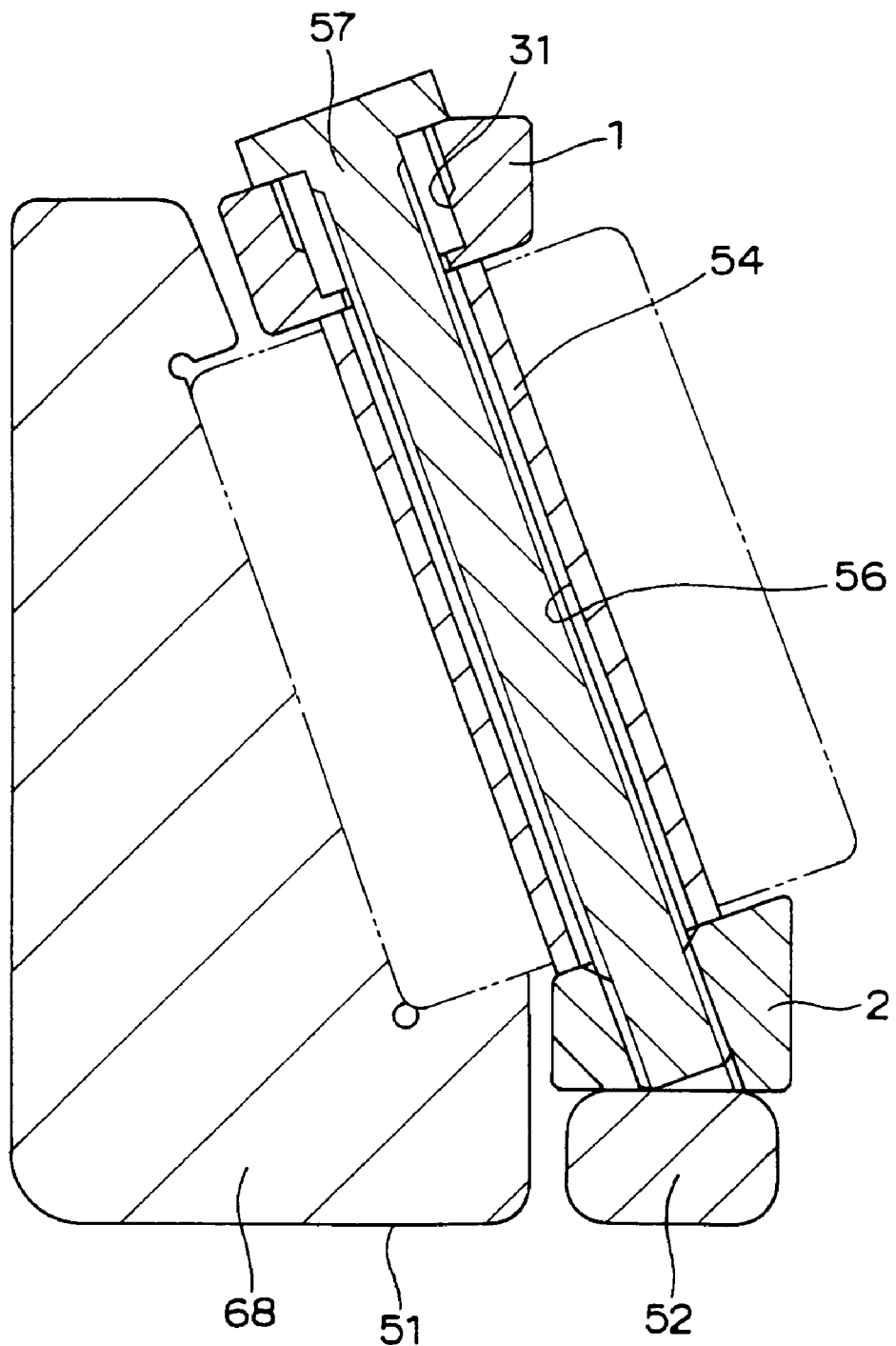
FIG. 2 is an end face view of an axial cross section of the pin type cage according to the first embodiment, showing a state during its manufacture.
Figure 3:
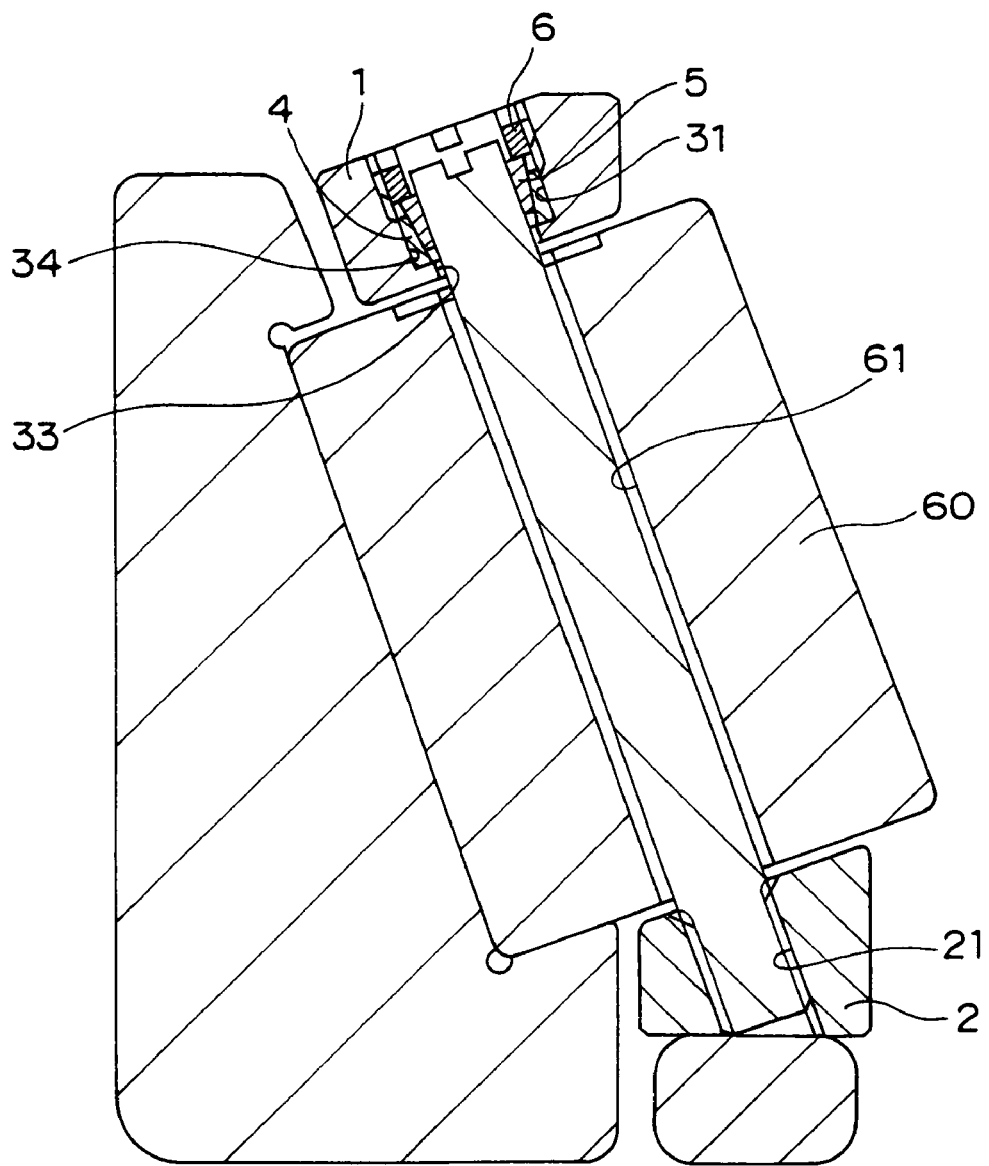
FIG. 3 is an end face view of an axial cross section of the pin type cage according to the first embodiment, showing a state during its manufacture.

FIGS. 2 and 3 are end face views of axial cross sections each showing a state during the manufacture of the pin type cage 100 of the first embodiment. Hereinafter, an example of the manufacturing method of the pin type cage 100 of the first embodiment will be described with reference to FIGS. 2 and 3.

First, a larger end face of the inner ring is placed on an unshown inner-ring mount, and subsequently a ring mount 52 is placed on the inner-ring mount. Thereafter, a second ring 2 is placed on the ring mount 52.

Subsequently, a plurality of cylindrical-shaped spacers 54 are placed on the second ring 2 so as to be circumferentially dispersed, and then the first ring 1 is placed on one side of the plurality of spacers 54 opposite to the second ring 2 side. It is noted that the spacers 54 are longer by a specified length than the tapered rollers 60. In this case, the specified length is generally equal to a length obtained by summing up a length from a tapered roller 60-side end face of the first ring 1 to a first ring 1-side end face of the tapered roller 60 in a completed-product tapered roller bearing and a length from a tapered roller 60-side end face of the second ring 2 to a second ring 2-side end face of the tapered roller 60.

Subsequently, a bolt 57 as en example of the temporary fixing member is inserted, from one side opposite to its head side, through the through hole 31 of the first ring 1 and through through holes 56 of the spacers 54 and, thereafter, screwed to the screw hole 21 of the second ring 2. This screwing is done until a contact between a lower face of the head portion of the bolt 57 and the first ring 1, a contact between an end face of the first ring 1 and a first ring 1-side end face of the spacer 54, and a contact between a second ring 2-side end face of the spacer 54 and an end face of the second ring 2 are obtained. FIG. 2 shows this state. In this way, the first ring 1 and the second ring 2 are temporarily fixed, and the second ring 2 is positioned axially and radially with respect to the first ring 1. It is noted that the number of bolts 57 is equal to the number of spacers 54, being smaller than the number of the through holes 31 of the first ring 1. The number of the bolts 57 is preferably 3 or more, and the number of the spacers 54 is preferably 3 or more.

Referring next to FIG. 3, the tapered roller 60 is placed between the through hole 31 of the first ring 1 and the screw hole 21 of the second ring 2, where the bolt 57 is not inserted, so that the through hole 61 of the tapered roller 60 overlaps. Thereafter, the pin 3 is inserted, from its male screw 42 side, into the through hole 31 of the first ring 1 and the through hole 61 of the tapered roller 60, and moreover the male screw 42 of the pin 3 is screwed to the screw hole 21 of the second ring 2.

Subsequently, the outer tapered member 4 is axially inserted into the through hole 31 from one side of the through hole 31 opposite to the tapered-member receiving portion 33 side and from the smaller-diameter side of the conical inner circumferential surface of the outer tapered member 4 until the axial end face of the outer tapered member 4 is brought into contact with the tapered-member receiving portion 33.

Subsequently, the inner tapered member 5 is axially inserted into the through hole 31 from one side of the through hole 31 opposite to the tapered-member receiving portion 33 side and from the smaller-diameter side of the conical outer circumferential surface of the inner tapered member 5, so that part of the conical outer circumferential surface of the inner tapered member 5 is brought into contact with part of the conical inner circumferential surface of the outer tapered member 4.

Subsequently, the male screw of the screw member 6 is screwed to the female screw 32 of the through hole 31 of the first ring 1, and driven toward the second ring 2 side in the axial direction, and by the screw member 6, the axial end face of the inner tapered member 5 on the side opposite to the second ring 2 side is pressed axially toward the second ring 2. In this way, the axial end face of the outer tapered member 4 and the axial end face of the inner tapered member 5 are pinched axially by the screw member 6 and the tapered-member receiving portion 33 so that the conical inner circumferential surface of the outer tapered member 4 and the conical outer circumferential surface of the inner tapered member 5 press against each other. Thus, the cylindrical outer circumferential surface of the outer tapered member 4 is pressed toward the cylindrical inner-circumferential-surface portion 34 of the through hole 31 of the first ring 1, while the cylindrical inner circumferential surface of the inner tapered member 5 is pressed against the outer circumferential surface of the through-hole placement portion of the pin 3. In this process, a specified tightening torque is applied to the screw member 6 so that a force with which the cylindrical outer circumferential surface of the outer tapered member 4 presses the cylindrical inner-circumferential-surface portion 34 of the through hole 31 of the first ring 1 is adjusted to be a specified force, and moreover that a force with which the cylindrical inner circumferential surface of the inner tapered member 5 presses the outer circumferential surface of the through-hole placement portion of the pin 3 is adjusted to be a specified force.

Subsequently, referring again to FIG. 2, after removal of the bolt 57 and removal of the spacers 54, by the method described above, the pin 3 is inserted and screwed into the through hole 31 of the first ring 1, from which the bolt 57 has been removed, as well as into the through hole 61 of the tapered roller 60 (see FIG. 3) and is inserted and screwed into the screw hole 21 of the second ring 2, so that the first ring 1, the second ring 2, the tapered roller 60, the pin 3, the outer tapered member 4 and the inner tapered member 5 are integrated together. FIG. 3 shows this state.

Finally, in the state that the force with which the cylindrical outer circumferential surface of the outer tapered member 4 presses the cylindrical inner-circumferential-surface portion 34 of the through hole 31 of the first ring 1, as well as the force with which the cylindrical inner circumferential surface of the inner tapered member 5 presses the outer circumferential surface of the through-hole placement portion of the pin 3, have been adjusted to specified forces by the screw member 6, the pin 3, the screw member 6 and the first ring 1 are integrated together so as to be kept from their relative movement by welding. Thus, the pin 3 and the screw member 6 are fixed to the first ring 1, where the fixation of the first ring 1 and the pin 3 is completed.

In the above-described method, with the spacers 54 provided as cylindrical-shaped ones, the bolt 57 is inserted into the through hole 56 of the spacers 54 so as to be temporarily fixed. However, for this invention, the spacers may be other than cylindrical-shaped, for example, may be columnar-shaped or the like. Then, the spacers that are columnar or other-shaped may be placed so as to be sandwiched between the first ring and the second ring and temporarily fixed by the bolt.

According to the pin type cage 100 of the first embodiment, only by adjusting the tightening extent of the screw member 6, the force with which the axial end face of the inner tapered member 5 on the side opposite to the second ring 2 side presses axially toward the second ring 2 can be adjusted. Therefore, the force with which the cylindrical outer circumferential surface of the outer tapered member 4 is pressed against the inner circumferential surface of the through hole 31 of the first ring 1 can be adjusted, so that the force with which the cylindrical inner circumferential surface of the inner tapered member 5 is pressed against the outer circumferential surface of the through-hole placement portion of the pin 3 can be adjusted. That is, only by adjusting the magnitude of the tightening torque for tightening the screw member 6, the interference between the pin 3 and the second ring 2 can be set to a desired interference with high accuracy.

Consequently, without requiring any strict machining accuracy in the machining of the through hole 31 of the first ring 1, the interference between the pin 3 and the first ring 1 can be set to a desired interference with high accuracy, so that the strength of the junction portion between the first ring 1 and the pin 3 can be easily set to a desired strength.

Also, only by adjusting the magnitude of the tightening torque for tightening the screw member 6, control and adjustment of the interference between the pin 3 and the first ring 1 can be accomplished with simplicity and low cost. Thus, there is no need for performing selective fitting of component members, so that the pin type cage can be assembled far more easily than conventional pin type cages having a need for performing the selective fitting of bushings during the manufacturing process, and moreover the mass productivity of the pin type cage can be improved to a large extent.

In the pin type cage 100 of the first embodiment, the outer tapered member 4 located radially outward of the pin 3 out of the two tapered members 4, 5 is provided by using a member having a C-shaped structure and formed by cutting at circumferential one place an annular member having a cylindrical outer circumferential surface and a conical inner circumferential surface of an identical axial center.

However, in this invention, out of the two tapered members, the outer tapered member positioned radially outward of the pin may be provided by a total P of 1st portion, 2nd portion, . . . , P-th portion which are formed by cutting an annular member having a cylindrical outer circumferential surface and a conical inner circumferential surface of an identical axial center into P divisions (where P is a natural number of 2 or more) with planes containing the axial center of the annular member. Further, a generally annular member made up together by those P portions may be used as the outer tapered member. In this invention also, the outer tapered member may be a non-divided annular member.

Also in the pin type cage 100 of the first embodiment, the inner tapered member 5 positioned radially inward of the pin 3, out of the two tapered members, is provided by using a member having a C-shaped structure and formed by cutting at circumferential one place an annular member having a conical outer circumferential surface and a cylindrical inner circumferential surface of an identical axial center.

However, in this invention, out of the two tapered members, the inner tapered member positioned radially inward of the pin may be provided by a total Q of 1st portion, . . . , Q-th portion which are formed by cutting an annular member having a conical outer circumferential surface and a cylindrical inner circumferential surface of an identical axial center into Q divisions (where Q is a natural number of 2 or more) with planes containing the axial center of the annular member. Further, a generally annular member made up together by those Q portions may be used as the inner tapered member.

Also in the pin type cage 100 of the first embodiment, the through hole 31 of the first ring 1 extends in a direction generally perpendicular to the tapered roller 60-side axial end face of the first ring 1, and the screw hole 21 of the second ring 2 extends in a direction generally perpendicular to the tapered roller 60-side axial end face of the second ring 2. However, in this invention, the through hole of the first ring may extend in a direction which is not perpendicular to the roller-side axial end face of the first ring, and the screw hole of the second ring may extend in a direction which is not perpendicular to the tapered roller-side axial end face of the second ring.

Also in the pin type cage 100 of the first embodiment, the axial center of the through holes 31 of the first ring 1 and the axial center of the screw holes 21 of the second ring 2 extend in directions forming acute angles to the axial direction of the pin type cage. However, in this invention, the axial center of the through holes of the first ring 1 may extend in a direction generally parallel to the axial direction of the pin type cage, and the axial center of the screw holes of the second ring may extend in a direction generally parallel to the axial direction of the pin type cage.

Also in the pin type cage 100 of the first embodiment, both the outer tapered member 4 and the inner tapered member 5 are members having a C-shaped structure. However, the outer tapered member and the inner tapered member may also be annular members, or generally annular members having a C-shaped structure, or generally annular members each formed from two or more member, or any one of these members for each.

In a case where the outer tapered member is provided as an annular member, the axial end face of the outer tapered member or the inner tapered member opposite to the second ring side is pressed axially toward the second ring by the screw member, so that the cylindrical inner circumferential surface of the inner tapered member is pressed against the outer circumferential surface of the through-hole placement portion of the pin. On the other hand, in a case where the inner tapered member is provided as an annular member, the axial end face of the outer tapered member or the inner tapered member opposite to the second ring 2 side is pressed axially toward the second ring by the screw member, so that the cylindrical outer circumferential surface of the outer tapered member is pressed toward the cylindrical inner circumferential surface of the through hole of the first ring.

In the pin type cage 100 of the first embodiment, the normal direction of the smaller-diameter side end face of the conical inner circumferential surface in the outer tapered member 4 is coincident with the axis line of the outer tapered member 4. However, in this invention, the normal direction of the smaller-diameter side end face of the conical inner circumferential surface in the outer tapered member may also be inclined to the axis line of the outer tapered member (where the perpendicular direction is excluded).

Also in the pin type cage 100 of the first embodiment, the normal direction of the larger-diameter side end face of the conical outer circumferential surface in the inner tapered member 5 is coincident with the axis line of the inner tapered member 5. However, in this invention, the normal direction of the larger-diameter side end face of the conical outer circumferential surface in the inner tapered member may also be inclined to the axis line of the inner tapered member (where the perpendicular direction is excluded).

Also in the pin type cage 100 of the first embodiment, the normal direction of the axial end face of the ring-shaped tapered-member receiving portion 33 opposite to the second ring side is coincident with the axis line of the through hole 31. However, in this invention, the normal direction of the axial end face of the ring-shaped tapered-member receiving portion opposite to the second ring side may also be inclined to the axis line of the through hole (where the perpendicular direction is excluded).

Also in the pin type cage 100 of the first embodiment, the number of the through holes 31 of the first ring 1, the number of the screw holes 21 of the second ring 2, and the number of the pins 3 are all equal to one another. However, in this invention, the number of the through holes of the first ring and the number of the screw holes of the second ring may be equal to or different from each other, while the number of the pins may be smaller than at least one the number of the through holes of the first ring and the number of screw holes of the second ring.

Also in the pin type cage 100 of the first embodiment, the tapered inner surface is provided as a generally conical inner circumferential surface. However, in this invention, the annular or generally annular tapered inner surface does not have to be a surface whose inner diameter increases proportionally (like a linear function) toward axial one side, and may be any surface only if it has an inner diameter increasing toward axial one side.

Also in the pin type cage 100 of the first embodiment, the tapered outer surface is provided as a generally conical outer circumferential surface. However, in this invention, the annular or generally annular tapered outer surface does not have to be a surface whose outer diameter increases proportionally (like a linear function) toward axial one side, and may be any surface only if it has an outer diameter increasing toward axial one side.

Also in the pin type cage 100 of the first embodiment, the end face of the screw member 6 and the axial end face of the inner tapered member 5 are in direct contact with each other. However, in this invention, the end face of the screw member and the axial end face of the inner tapered member may also be in contact with each other via such an intervenient as a washer. Also in the pin type cage 100 of the first embodiment, the tapered-member receiving portion 33 and the axial end face of the outer tapered member 4 are in direct contact with each other. However, in this invention, the tapered-member receiving portion and the axial end face of the outer tapered member may also be in contact with each other via such an intervenient as a washer. The axial end face of the outer tapered member and the axial end face of the inner tapered member may be in contact with each other via an intervenient as described above only if the two members are axially sandwiched by the screw member and the tapered-member receiving portion as a move-preventing portion while the conical inner circumferential surface of the outer tapered member and the conical outer circumferential surface of the inner tapered member can be pressed by each other.

Figure 4:
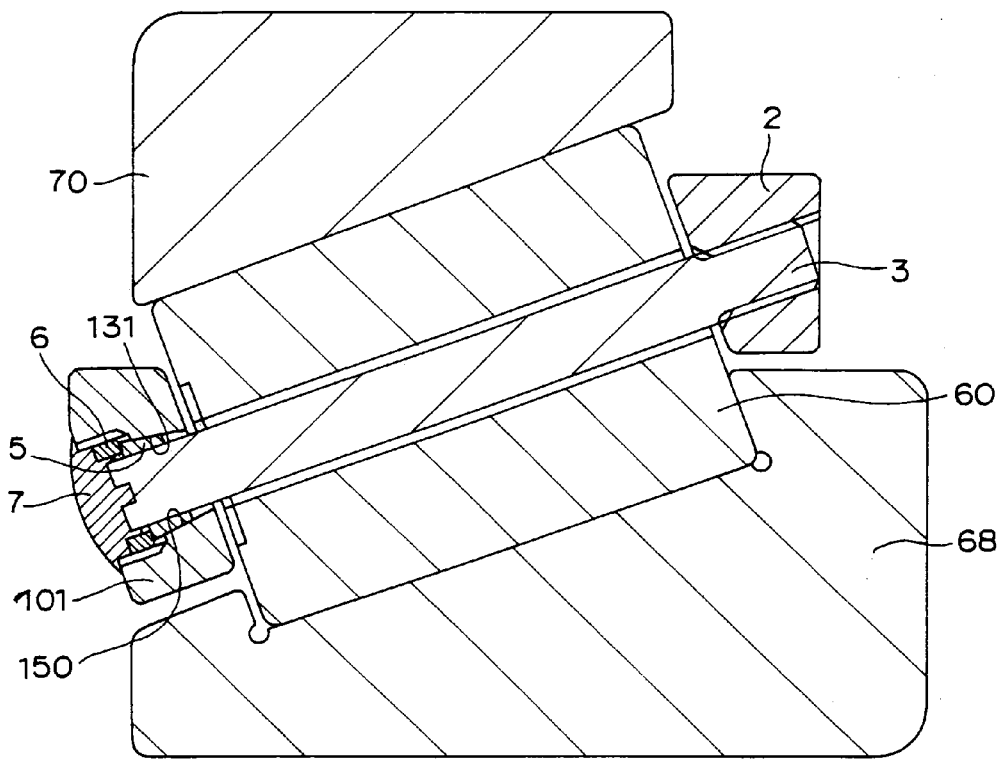
FIG. 4 is an end face view of an axial cross section of a tapered roller bearing according to a second embodiment of the invention.

FIG. 4 is an end face view of an axial cross section of a tapered roller bearing according to a second embodiment of the invention.

In the second embodiment, the same component parts as those of the first embodiment are designated by the same reference numerals, and their description is omitted. Also in the second embodiment, functional effects and modifications common to the first embodiment are omitted in description, and component parts different from those of the first embodiment only are described below.

The second embodiment differs from the first embodiment only in that the outer tapered member 4 of the first embodiment is formed integral with the first ring 1 of the first embodiment.

That is, in the second embodiment, the inner circumferential surface of through holes 131 of a first ring 101 has a conical inner circumferential surface 150 as a tapered inner surface.

Even if the outer tapered member is formed integral with the inner circumferential surface of the through holes of the first ring, it is needless to say that the technical problems to be solved by the invention can be solved.

According to the second embodiment, the inner tapered member 5 can be easily pressed against the inner circumferential surface (tapered inner surface) of the through holes 131 of the first ring 101 and against the outer circumferential surface of the through-hole placement portion of the pin 3 placed at the through holes 131. Also, a desired surface pressure can be applied easily and inexpensively to between the tapered outer surface 150 and the tapered inner surface of the inner tapered member 5 and between the cylindrical inner circumferential surface of the inner tapered member 5 and the outer circumferential surface of the through-hole placement portion of the pin 3. Moreover, the pin type cage becomes good at strength and excellent in mass productivity.

Figure 5:
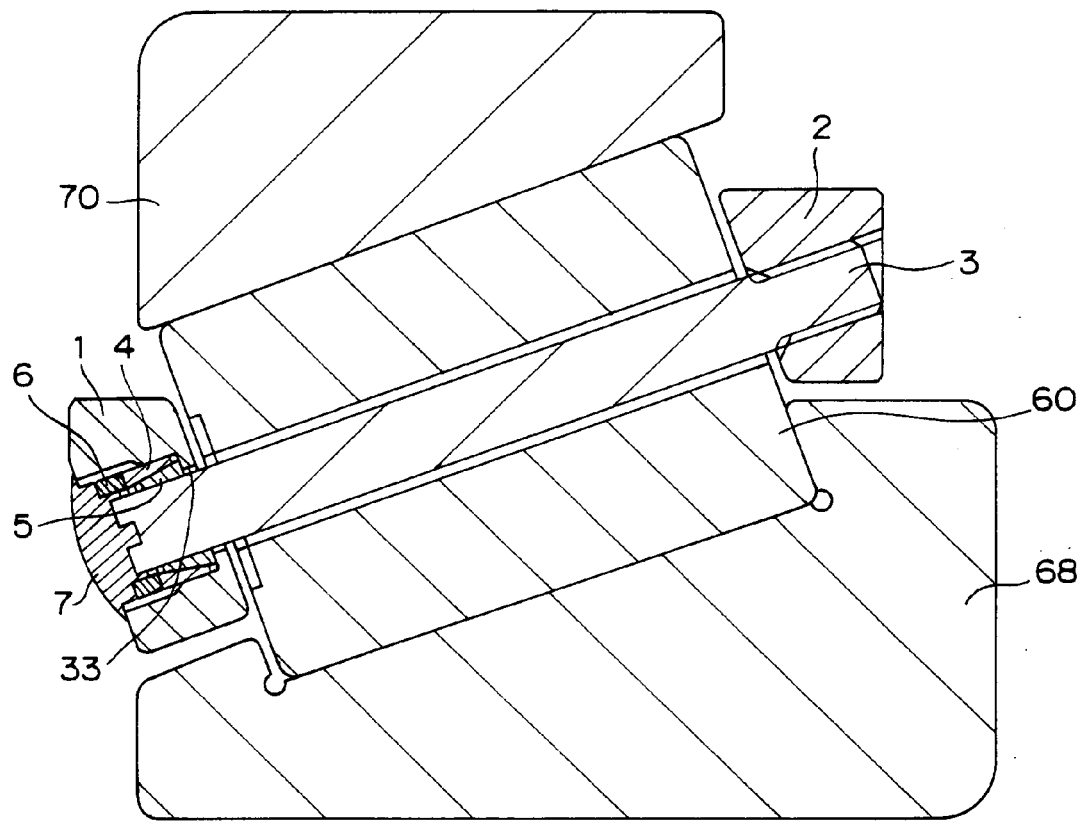
FIG. 5 is an end face view of an axial cross section of a tapered roller bearing according to a third embodiment of the invention.

FIG. 5 is an end face view of an axial cross section of a tapered roller bearing according to a third embodiment of the invention.

In the third embodiment, the same component parts as those of the first embodiment are designated by the same reference numerals, and their description is omitted. Also in the third embodiment, functional effects and modifications common to the first embodiment are omitted in description, and component parts different from those of the first embodiment only are described below. It is noted that reference numeral 7 denotes a weld part also in FIG. 5.

The third embodiment differs from the first embodiment only in that the axial direction of the outer tapered member 4 is reversed and moreover the axial direction of the inner tapered member 5 is reversed.

That is, in the third embodiment, the outer tapered member 4 is placed within the through hole 31 of the first ring 1 so that the larger-diameter side end face of the conical inner circumferential surface in the outer tapered member 4 is positioned closer to the tapered-member receiving portion 33. Also, the inner tapered member 5 is placed within the through hole 31 of the first ring 1 so that the larger-diameter side end face of the conical outer circumferential surface in the inner tapered member 5 is positioned closer to the tapered-member receiving portion 33.

As in the third embodiment, even if the axial direction of the outer tapered member 4 and the axial direction of the inner tapered member 5 are reversed in comparison to the first embodiment, a desired surface pressure can be applied easily and inexpensively to the inner circumferential surface of the through hole 31 of the first ring 1 and the outer circumferential surface of the through-hole placement portion of the pin 3 placed in the through hole 31. Moreover, the pin type cage becomes good at strength and excellent in mass productivity.

Figure 6:
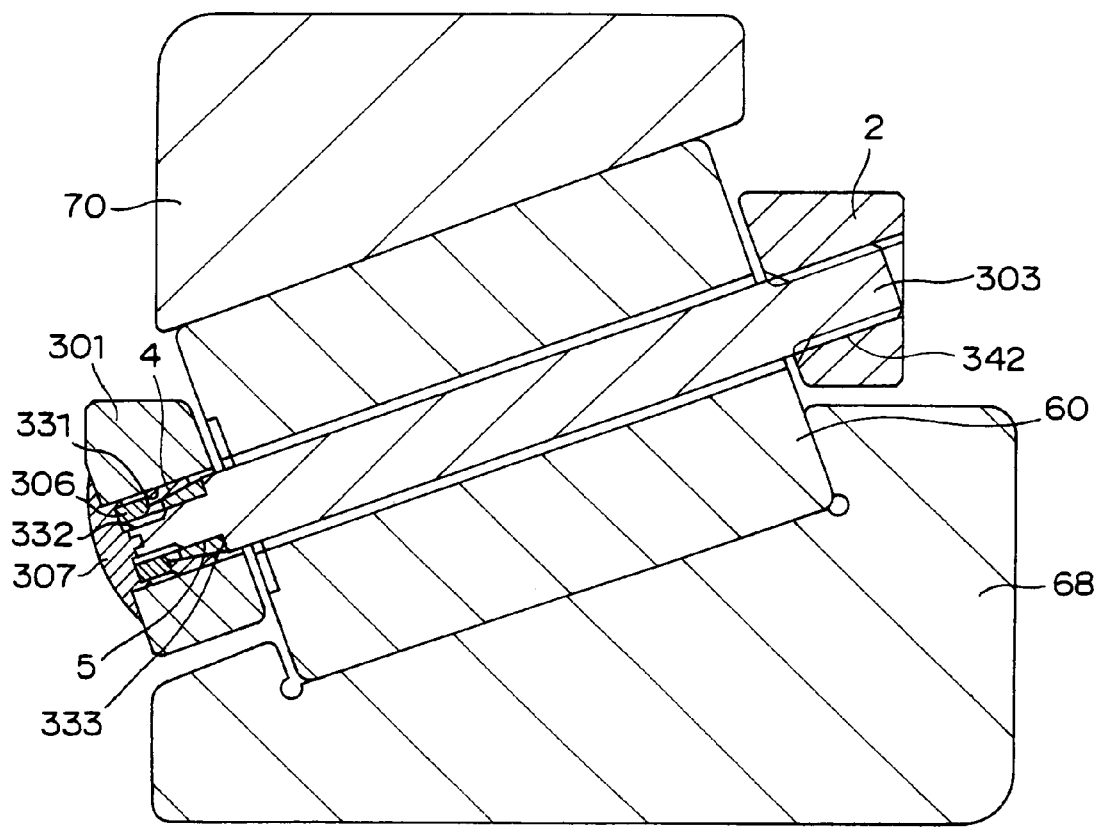
FIG. 6 is an end face view of an axial cross section of a tapered roller bearing according to a fourth embodiment of the invention.

FIG. 6 is an end face view of an axial cross section of a tapered roller bearing according to a fourth embodiment of the invention.

In the fourth embodiment, the same component parts as those of the first embodiment are designated by the same reference signs, and their description is omitted. Also in the fourth embodiment, functional effects and modifications common to the first embodiment are omitted in description, and component parts different from those of the first embodiment only are described below.

The fourth embodiment differs from the first embodiment in that the axial direction of the outer tapered member 4 is reversed and moreover the axial direction of the inner tapered member 5 is reversed.

Also, the fourth embodiment differs from the first embodiment in that a first ring 301 has no tapered-member receiving portion 33 (see FIG. 1) while a portion of a pin 303 that is placed within a through hole 331 of the first ring 301 has a step portion 333 as a move-preventing portion.

The fourth embodiment further differs from the first embodiment in that a second ring 2 side axial end face of the inner tapered member 5 is in contact with the step portion 333.

The fourth embodiment also differs from the first embodiment in that the outer circumferential surface of one end portion of the pin 303 has a male screw, while the inner circumferential surface of a screw member 306 has a female screw, so that the male screw of the pin 303 and the female screw of the screw member 306 are screwed to each other. The pin 303 has a male screw 342 formed at the other end portion on its second ring side.

Figure 12:
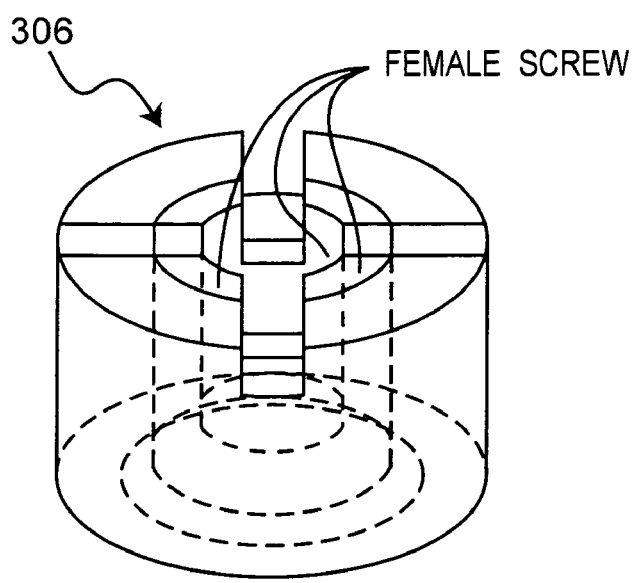
FIG. 12 is a perspective view of a screw member in the fourth, fifth and sixth embodiments.

Also in the fourth embodiment, the axial end face of the outer tapered member 4 opposite to the second ring 2 side is in contact with the second ring 2 side axial end face of the screw member 306. FIG. 12 is a perspective view of the screw member 306. As shown in FIG. 12, the axial end face of the screw member 306 opposite to the second ring 2 side has a cross-shaped cutout formed therein.

In the fourth embodiment, the inner circumferential surface of the through hole 331 of the first ring 301 is formed as a cylindrical inner circumferential surface. Also, the pin 303 is cylindrical-shaped and has the male screw 342 at the other end portion on the second ring 2 side. Further, a step portion 333 and a smaller-diameter portion are formed at one end portion of the pin 303, where the smaller-diameter portion is located axially outer than the step portion 333. A male screw 332 is formed at the smaller-diameter portion so as to extend from one end of the smaller-diameter portion to a specified distance, while a slit-like cutout is formed radially at one end face. The cutout is opened at a place where the male screw 332 is formed in the outer circumferential surface of the pin 303.

Part of the male screw 332 and the incomplete screw portion overlap radially with part of the outer tapered member 4 and moreover radially with part of the inner tapered member 5. Further, the part of the male screw 332 and the incomplete screw portion overlap radially with part of the portion of the tapered inner surface (generally annular-shaped conical inner circumferential surface) that is in contact with the tapered outer surface (generally annular-shaped conical outer circumferential surface). In addition, preferably, the part of the male screw 332 and the incomplete screw portion overlap with ½ or less, preferably ⅓ or less, of the contact portion of the tapered inner surface with the tapered outer surface. More preferably, the part of the male screw and the incomplete screw portion are positioned with a space in the axial direction to the contact portion of the tapered inner surface with the tapered outer surface.

In the fourth embodiment, the outer tapered member 4 and the inner tapered member 5 are axially pressed by the screw member 306 screwed to the pin 303 and the step portion 333 of the pin 303.

Also in the fourth embodiment, a desired surface pressure can be applied easily and inexpensively to the inner circumferential surface of the through hole 331 of the first ring 301 and the outer circumferential surface of the through-hole placement portion of the pin 303 placed in the through hole 331. Moreover, the tapered roller bearing becomes good at strength and excellent in mass productivity.

Figure 7:
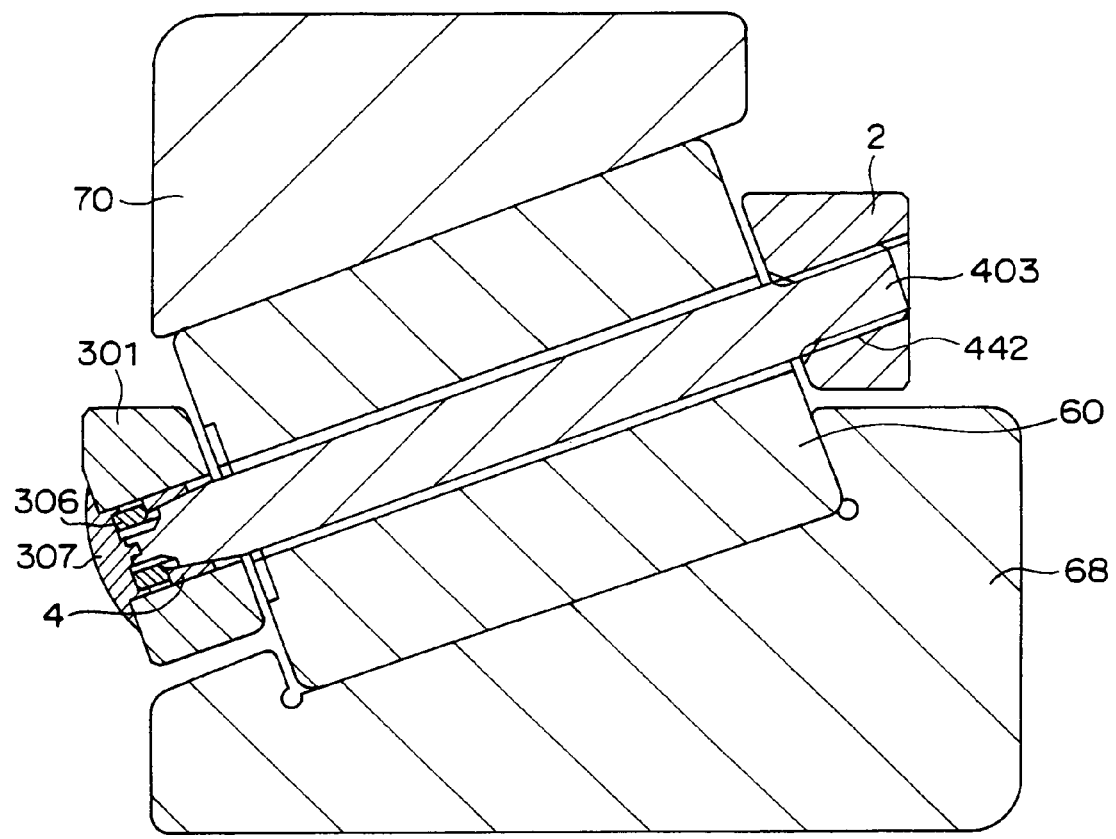
FIG. 7 is an end face view of an axial cross section of a tapered roller bearing according to a fifth embodiment of the invention.

FIG. 7 is an end face view of an axial cross section of a tapered roller bearing according to a fifth embodiment of the invention.

In the fifth embodiment, the same component parts as those of the fourth embodiment are designated by the same reference signs, and their description is omitted. Also in the fifth embodiment, functional effects and modifications common to the fourth embodiment are omitted in description, and component parts different from those of the fourth embodiment only are described below.

The fifth embodiment differs from the fourth embodiment only in that the inner tapered member 5 (see FIG. 6) is provided integrally with the pin 303 (see FIG. 6).

In the fifth embodiment, the pin 403 is cylindrical-shaped and has the male screw 442 at the other end portion on the second ring 2 side. Also, a conical outer circumferential surface as a tapered outer surface is formed at one end portion of the pin 403, where the conical outer circumferential surface decreases in diameter axially outward (toward one side opposite to the second ring 2 side). Further, a step portion and a smaller-diameter portion are formed at a smaller-diameter side of the conical outer circumferential surface of the pin 403, where the smaller-diameter portion is located axially outer than the step portion (on one side opposite to the second ring 2 side). A male screw is formed at the smaller-diameter portion so as to extend from one end of the smaller-diameter portion to a specified distance, while a slit-like cutout is formed radially at one end face. The cutout is opened at a place where the male screw is formed in the outer circumferential surface of the pin 403.

In the fifth embodiment, the outer tapered member 4 can easily be pressed against the inner circumferential surface of the through hole 331 of the first ring 301 and outer circumferential surface (tapered outer surface) of the through-hole placement portion of the pin 403 placed within the through hole 331. Also, a desired surface pressure can be applied easily and inexpensively to between the tapered inner surface of the outer tapered member 4 and the tapered outer surface of the pin 403 and between the cylindrical outer circumferential surface of the outer tapered member 4 and the inner circumferential surface of the through hole 331. Moreover, the tapered roller bearing becomes good at strength and excellent in mass productivity.

Figure 8:
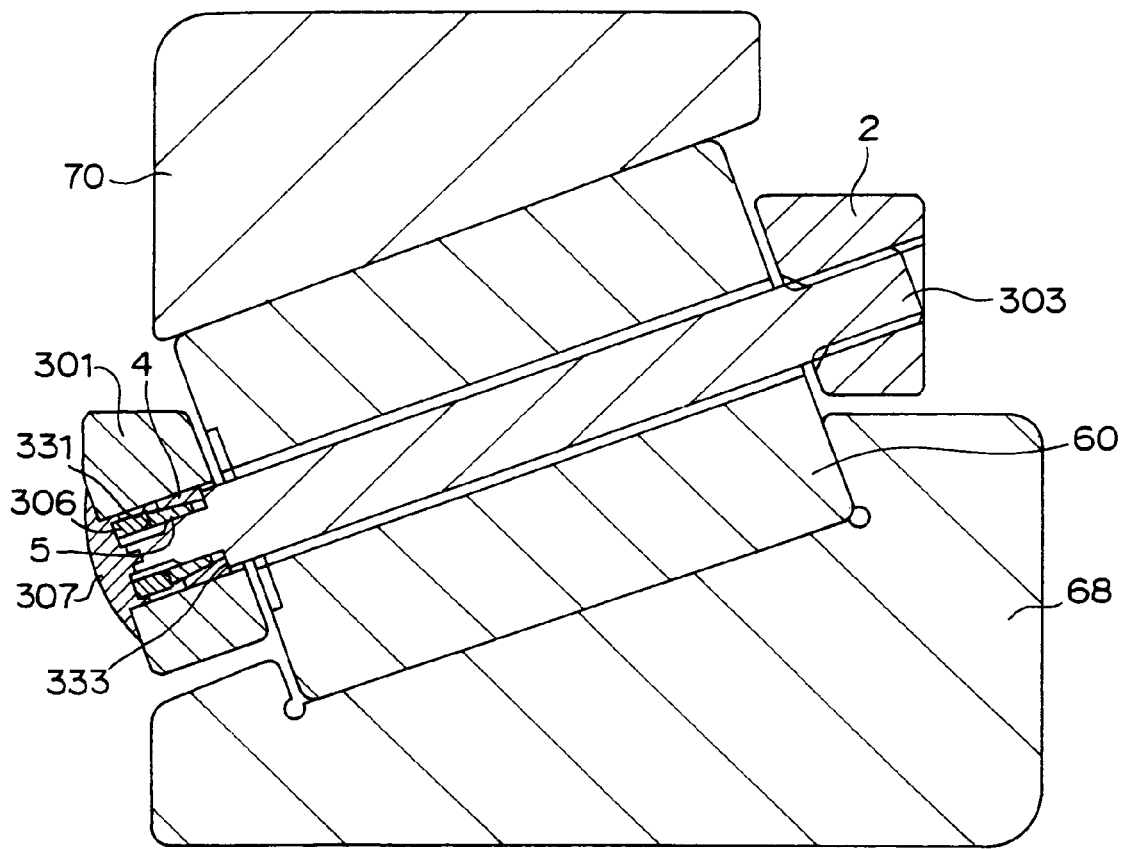
FIG. 8 is an end face view of an axial cross section of a tapered roller bearing according to a sixth embodiment of the invention.

FIG. 8 is an end face view of an axial cross section of a tapered roller bearing according to a sixth embodiment of the invention.

In the sixth embodiment, the same component parts as those of the fourth embodiment are designated by the same reference numerals, and their description is omitted. Also in the sixth embodiment, functional effects and modifications common to the fourth embodiment are omitted in description, and component parts different from those of the fourth embodiment only are described below. It is noted that reference numeral 307 denotes a weld part also in FIG. 8.

The sixth embodiment differs from the fourth embodiment only in that the axial direction of the outer tapered member 4 is reversed and moreover the axial direction of the inner tapered member 5 is reversed.

That is, in the sixth embodiment, the outer tapered member 4 is placed within the through hole 331 of the first ring 301 so that the smaller-diameter side end face of the conical inner circumferential surface of the outer tapered member 4 is located closer to the step portion 333. Also, the inner tapered member 5 is placed within the through hole 331 of the first ring 301 so that the smaller-diameter side end face of the conical outer circumferential surface of the inner tapered member 5 is located closer to the step portion 333.

As in the sixth embodiment, even if the axial direction of the outer tapered member 4 and the axial direction of the inner tapered member 5 are reversed in comparison to the fourth embodiment, a desired surface pressure can be applied easily and inexpensively to the inner circumferential surface of the through hole 331 of the first ring 301 and the outer circumferential surface of the through-hole placement portion of the pin 303 placed in the through hole 331. Moreover, the tapered roller bearing becomes good at strength and excellent in mass productivity.

References Signs List
- 1, 101, 301 first ring
- 2 second ring
- 3, 303, 403 pin
- 4 outer tapered member
- 5 inner tapered member
- 6, 306 screw member
- 7, 307 weld part
- 21 screw hole of second ring
- 31, 131, 331 through hole of first ring
- 32, 332 screw portion of one circumferential surface
- 33 tapered-member receiving portion
- 34 cylindrical inner-circumferential-surface portion of through hole
- 41 outer-circumferential cylindrical surface portion of pin
- 42, 342, 442 male screw portion
- 150 conical inner circumferential surface
- 333 step portion

The invention claimed is:

1. A pin type cage comprising:
a first ring having a plurality of through holes placed so as to be circumferentially spaced from one another;
a pin which is inserted into a through hole of a roller and which has a through-hole placement portion placed within the through hole of the first ring;
an outer tapered member having an outer surface in contact with an inner circumferential surface of the through hole of the first ring, an end face located on axial one side, and an annular or generally annular tapered inner surface whose inner diameter increases with increasing axial distance from the end face;
an inner tapered member having an inner surface in contact with the through-hole placement portion of the pin, an end face located on axial one side opposite to the end face side of the outer tapered member, and an annular or generally annular tapered outer surface whose outer diameter decreases with increasing axial distance from the end face and which is in contact with the tapered inner surface of the outer tapered member; and
a screw member which has a screw portion and which is in direct contact with or in contact via an intervenient with one end face out of the end face of the outer tapered member and the end face of inner tapered member, wherein
a circumferential surface out of an inner circumferential surface of the through hole of the first ring and an outer circumferential surface of the pin has a screw portion that is screwed with the screw portion of the screw member,
the pin type cage further has a move-preventing portion which adjoins one circumferential surface out of the inner circumferential surface of the through hole of the first ring and the outer circumferential surface of the pin so as to be in direct contact with or in contact via an intervenient with the other end face out of the end face of the outer tapered member and the end face of the inner tapered member so that the move-preventing portion prevents the end face of the inner tapered member from moving toward one side opposite to the end face side of the outer tapered member in the axial direction,
the one end face and the other end face are pressed axially by an axial force generated by being sandwiched between the screw member and the move-preventing portion, so that the tapered inner surface of the outer tapered member and the tapered outer surface of the inner tapered member are pressed by each other,
the first ring and the pin are fixed by at least one of the pressing of the outer surface of the outer tapered member against the inner circumferential surface of the through hole and the pressing of the inner surface of the inner tapered member against the through-hole placement portion of the pin, and
the pin type cage includes a weld part which is in contact with the screw member, and one of the first ring having the screw portion to be screwed to the screw portion of the screw member and the pin.

2. The pin type cage as claimed in claim 1, wherein given an angle α formed by an axis line of the tapered outer surface and a generatrix of the tapered outer surface, it holds that $1/10 \leq \tan\alpha \leq 1/3$.

3. The pin type cage as claimed in claim 1, wherein given an angle α formed by an axis line of the tapered inner surface and a generatrix of the tapered inner surface, it holds that $1/10 \leq \tan\alpha \leq 1/3$.

4. The pin type cage as claimed in claim 1, wherein the inner tapered member is formed by cutting an annular member at one or more places in its circumferential direction.

5. The pin type cage as claimed in claim 1, wherein the outer tapered member is formed by cutting an annular member at one or more places in its circumferential direction.

6. The pin type cage as claimed in claim 1, wherein the weld part is in contact with the first ring, the pin and the screw member.

7. The pin type cage as claimed in claim 1, further comprising:
a second ring which has a plurality of screw holes placed so as to be circumferentially spaced from one another and which is located with a space to the first ring in an axial direction of the first ring,
wherein the pin has a male screw to be screwed to the screw hole of the second ring.

8. A pin type cage assembling method for assembling the pin type cage as defined in claim 7, comprising:
preparing the first ring, the second ring, a plurality N of the rollers, the plurality N of the pins, a plurality M (M<N) of spacers each having a length longer than an axial length of each of the rollers, and a temporary fixing member;
setting the spacers interposed between the first ring and the second ring so as to be circumferentially spaced from one another;
thereafter, by the temporary fixing member, tightening the first ring and the second ring so that the two members become immovable relative to each other while center axes of the through holes of the first ring and center axes of the screw holes of the second ring are positioned generally on one straight line;
inserting the pin through the through holes of the first ring that are not blocked by the spacers and then through the through holes of the rollers, followed by screwing the male screw of the inserted pin to the screw hole of the second ring;
subsequently, placing at least one of the outer tapered member and the inner tapered member between the through holes of the first ring and the through-hole placement portion of the pin, so that the tapered outer surface and the tapered inner surface are brought into contact with each other;
subsequently, tightening the screw member by screwing to the first ring or the pin so that the tapered outer surface and the tapered inner surface are pressed against each other;
subsequently, undoing the tightening of the temporary fixing member; and
removing the spacers.

9. The pin type cage as claimed in claim 1, wherein
the inner circumferential surface of the through hole of the first ring has the screw portion that is screwed with the screw portion of the screw member,
the move-preventing portion adjoins the inner circumferential surface of the through hole of the first ring so as to be in direct contact with or in contact via an intervenient with the end face of the outer tapered member, and
the pin type cage further comprises a second ring which has a plurality of screw holes placed so as to be circumferentially spaced from one another and which is spaced from the first ring in an axial direction of the first ring, wherein
the pin has a male screw to be screwed to a screw hole of the second ring, and
the outer circumferential surface of the pin has the male screw and an outer-circumferential cylindrical surface portion including the through-hole placement portion.

10. A pin type cage comprising:
a first ring having a plurality of through holes placed so as to be circumferentially spaced from one another, an annular tapered inner surface which is placed within each through hole and whose inner diameter increases toward axial one side, and a screw portion located within each through hole and on a larger-diameter side of the tapered inner surface;
a pin which is inserted into a through hole of a roller and which has a through-hole placement portion placed within the through hole of the first ring;
an inner tapered member having an inner surface in contact with the through-hole placement portion of the pin, an annular or generally annular tapered outer surface whose outer diameter increases toward axial one side and which is in contact with the tapered inner surface, and an end face located on the larger-diameter side of the tapered outer surface; and
a screw member which has a screw portion screwed to the screw portion of the first ring and which is in direct contact with or in contact via an intervenient with the end face of the inner tapered member, wherein
the tapered outer surface of the inner tapered member is pressed against the tapered inner surface of the first ring by the screwing of the screw portion of the first ring and the screw portion of the screw member to each other, and
the first ring and the pin are fixed by pressing of the inner surface of the inner tapered member against the outer circumferential surface of the through-hole placement portion of the pin, and
the pin type cage includes a weld part which is in contact with the first ring and the screw member.

11. The pin type cage as claimed in claim 10, further comprising:
a second ring which has a plurality of screw holes placed so as to be circumferentially spaced from one another and which is located with a space to the first ring in an axial direction of the first ring,
wherein the pin has a male screw to be screwed to the screw hole of the second ring.

12. A pin type cage assembling method for assembling the pin type cage as defined in claim 11, comprising:
preparing the first ring, the second ring, a plurality N of the rollers, the plurality N of the pins, a plurality M (M<N) of spacers each having a length longer than an axial length of each of the rollers, and a temporary fixing member;
setting the spacers interposed between the first ring and the second ring so as to be circumferentially spaced from one another;
thereafter, by the temporary fixing member, tightening the first ring and the second ring so that the two members become immovable relative to each other while center axes of the through holes of the first ring and center axes of the screw holes of the second ring are positioned generally on one straight line;

inserting the pin through the through holes of the first ring that are not blocked by the spacers and then through the through holes of the rollers, followed by screwing the male screw of the inserted pin to the screw hole of the second ring;

subsequently, placing at least one of the outer tapered member and the inner tapered member between the through holes of the first ring and the through-hole placement portion of the pin, so that the tapered outer surface and the tapered inner surface are brought into contact with each other;

subsequently, tightening the screw member by screwing to the first ring or the pin so that the tapered outer surface and the tapered inner surface are pressed against each other;

subsequently, undoing the tightening of the temporary fixing member; and removing the spacers.

13. The pin type cage as claimed in claim 10, wherein the weld part is in contact with the first ring, the pin and the screw member.

14. The pin type cage as claimed in claim 10, wherein given an angle α formed by an axis line of the tapered outer surface and a generatrix of the tapered outer surface, it holds that $1/10 \leq \tan \alpha \leq 1/3$.

15. The pin type cage as claimed in claim 10, further comprising
 a second ring which has a plurality of screw holes placed so as to be circumferentially spaced from one another and which is spaced from the first ring in an axial direction of the first ring,
 wherein the pin has a male screw to be screwed to a screw hole of the second ring, and
 the outer circumferential surface of the pin has the male screw and an outer-circumferential cylindrical surface portion including the through-hole placement portion.

16. A pin type cage comprising:
 a first ring having a plurality of through holes placed so as to be circumferentially spaced from one another;
 a pin which is inserted into a through hole of a roller and which has a through-hole placement portion placed within the through hole of the first ring, an annular tapered outer surface located at an outer circumferential surface of the through-hole placement portion and having an outer diameter gradually decreasing toward axial one side, and a screw portion located on a smaller-diameter side of the tapered outer surface;
 an outer tapered member having an outer surface in contact with an inner circumferential surface of the through hole of the first ring, an end face on axial one side, and an annular or generally annular tapered inner surface whose inner diameter decreases with decreasing distance to the end face and which is in contact with the tapered outer surface; and
 a screw member which has a screw portion screwed to the screw portion of the pin and which is in direct contact with or in contact via an intervenient with the end face of the outer tapered member, wherein
 the tapered inner surface of the outer tapered member is pressed against the tapered outer surface of the pin by the screwing of the screw portion of the pin and the screw portion of the screw member to each other,
 the first ring and the pin are fixed by pressing of the outer surface of the outer tapered member against the inner circumferential surface of the through hole, and
 the pin type cage includes a weld part which is in contact with the pin and the screw member.

17. The pin type cage as claimed in claim 16, wherein the outer tapered member is formed by cutting an annular member at one or more places in its circumferential direction.

18. The pin type cage as claimed in claim 16, wherein given an angle α formed by an axis line of the tapered inner surface and a generatrix of the tapered inner surface, it holds that $1/10 \leq \tan \alpha \leq 1/3$.

19. The pin type cage as claimed in claim 16, wherein the weld part is in contact with the first ring, the pin and the screw member.

20. The pin type cage as claimed in claim 16, further comprising:
 a second ring which has a plurality of screw holes placed so as to be circumferentially spaced from one another and which is located with a space to the first ring in an axial direction of the first ring,
 wherein the pin has a male screw to be screwed to the screw hole of the second ring.

21. A pin type cage assembling method for assembling the pin type cage as defined in claim 20, comprising:
 preparing the first ring, the second ring, a plurality N of the rollers, the plurality N of the pins, a plurality M (M<N) of spacers each having a length longer than an axial length of each of the rollers, and a temporary fixing member;
 setting the spacers interposed between the first ring and the second ring so as to be circumferentially spaced from one another;
 thereafter, by the temporary fixing member, tightening the first ring and the second ring so that the two members become immovable relative to each other while center axes of the through holes of the first ring and center axes of the screw holes of the second ring are positioned generally on one straight line;
 inserting the pin through the through holes of the first ring that are not blocked by the spacers and then through the through holes of the rollers, followed by screwing the male screw of the inserted pin to the screw hole of the second ring;
 subsequently, placing at least one of the outer tapered member and the inner tapered member between the through holes of the first ring and the through-hole placement portion of the pin, so that the tapered outer surface and the tapered inner surface are brought into contact with each other;
 subsequently, tightening the screw member by screwing to the first ring or the pin so that the tapered outer surface and the tapered inner surface are pressed against each other;
 subsequently, undoing the tightening of the temporary fixing member; and
 removing the spacers.

* * * * *